United States Patent
Doerry et al.

(10) Patent No.: US 9,304,198 B1
(45) Date of Patent: Apr. 5, 2016

(54) NAVIGATOR ALIGNMENT USING RADAR SCAN

(71) Applicants: Sandia Corporation, Albuquerque, NM (US); General Atomics Aeronautical Systems, Inc, San Diego, CA (US)

(72) Inventors: Armin W. Doerry, Albuquerque, NM (US); Brandeis Marquette, Escondido, CA (US)

(73) Assignee: Sandia Corporation, Albuquerque, NM (US)

( * ) Notice: Subject to any disclaimer, the term of this patent is extended or adjusted under 35 U.S.C. 154(b) by 263 days.

(21) Appl. No.: 14/046,145

(22) Filed: Oct. 4, 2013

(51) Int. Cl.
| | |
|---|---|
| *G01S 13/60* | (2006.01) |
| *G01S 13/88* | (2006.01) |
| *G01S 5/16* | (2006.01) |
| *G01S 13/00* | (2006.01) |
| *G01S 13/89* | (2006.01) |
| *G01S 13/90* | (2006.01) |

(52) U.S. Cl.
CPC . *G01S 13/60* (2013.01); *G01S 5/16* (2013.01); *G01S 13/88* (2013.01); *G01S 13/89* (2013.01); *G01S 13/90* (2013.01)

(58) Field of Classification Search
CPC ......... G01S 13/02; G01S 13/50; G01S 13/58; G01S 13/60; G01S 5/16; G01S 5/163; G01S 13/88; G01S 13/89; G01S 13/90; G05D 1/02; G05D 1/0202; G05D 1/021; G05D 1/0257
USPC ............. 342/42–51, 61–65, 66, 67, 104–109, 342/25 R–25 F; 701/400, 408, 514, 518, 701/530, 534–536, 468, 500–512, 466, 467, 701/494, 499; 244/3.1, 3.15–3.19
See application file for complete search history.

(56) References Cited

U.S. PATENT DOCUMENTS

| | | | | | |
|---|---|---|---|---|---|
| 3,683,378 | A | * | 8/1972 | Polhemus | 701/499 |
| 4,070,674 | A | * | 1/1978 | Buell et al. | 342/67 |
| 4,144,571 | A | * | 3/1979 | Webber | 342/63 |
| 4,179,693 | A | * | 12/1979 | Evans et al. | 342/64 |
| 4,204,210 | A | * | 5/1980 | Hose | 342/62 |
| 4,402,049 | A | * | 8/1983 | Gray | 701/466 |
| 4,490,719 | A | * | 12/1984 | Botwin et al. | 342/64 |

(Continued)

OTHER PUBLICATIONS

Marquette, et al., "SAR Image Feedback for Improved Inertial Measurement Unit Alignment", Radar Conference, 2010 IEEE, May 10-14, 2010, pp. 684-688.

(Continued)

*Primary Examiner* — Bernarr Gregory
(74) *Attorney, Agent, or Firm* — Medley, Behrens & Lewis, LLC

(57) ABSTRACT

The various technologies presented herein relate to the determination of and correction of heading error of platform. Knowledge of at least one of a maximum Doppler frequency or a minimum Doppler bandwidth pertaining to a plurality of radar echoes can be utilized to facilitate correction of the heading error. Heading error can occur as a result of component drift. In an ideal situation, a boresight direction of an antenna or the front of an aircraft will have associated therewith at least one of a maximum Doppler frequency or a minimum Doppler bandwidth. As the boresight direction of the antenna strays from a direction of travel at least one of the maximum Doppler frequency or a minimum Doppler bandwidth will shift away, either left or right, from the ideal situation.

18 Claims, 9 Drawing Sheets

(56) References Cited

U.S. PATENT DOCUMENTS

| | | | |
|---|---|---|---|
| 4,514,733 A * | 4/1985 | Schmidtlein et al. | 342/64 |
| 4,536,763 A * | 8/1985 | von Pieverling | 342/107 |
| 4,584,646 A * | 4/1986 | Chan et al. | 701/518 |
| 4,675,822 A * | 6/1987 | Marino et al. | 701/501 |
| 4,698,635 A * | 10/1987 | Hilton et al. | 342/64 |
| 4,829,304 A * | 5/1989 | Baird | 342/63 |
| 4,939,663 A * | 7/1990 | Baird | 342/64 |
| 5,168,277 A * | 12/1992 | LaPinta et al. | 342/62 |
| 6,593,875 B2 * | 7/2003 | Bergin et al. | 342/64 |
| 8,212,714 B1 | 7/2012 | Doerry et al. | |

OTHER PUBLICATIONS

Kim, et al., "An Integrated Navigation System Using GPS Carrier Phase for Real-Time Airborne Synthetic Aperture Radar (SAR)", Navigation, vol. 48, No. 1, 2001, pp. 1-10.

* cited by examiner

NAVIGATOR ALIGNMENT USING RADAR SCAN

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Proper operation of high-performance synthetic aperture radar/ground moving target indication (SAR/GMTI) radar systems requires precise measurements of platform motion (e.g., motion of an aircraft). This is commonly performed with a global positioning system (GPS)-aided Inertial Navigation System (INS). Integral to an INS is an Inertial Measurement Unit (IMU), whereby the IMU is typically composed of three orthogonal accelerometers and three orthogonal rate gyroscopes. The task of the GPS is to provide absolute references for correcting errors which can occur at the IMU owing to noise, drift, etc.

The combining of the GPS and IMU data to estimate errors and corrections, and to achieve a blended motion measurement solution, is often performed utilizing a linear quadratic estimation (LQE) such as a Kalman Filter (KF), an Extended Kalman Filter (EKF), etc. Such an algorithm and its implementation are frequently termed the "navigator". The correction of IMU motion information is termed "alignment" of the navigator.

The GPS can provide data to correct errors in accelerometer data. Roll and pitch gyroscopic errors can be corrected with the additional knowledge of gravity, which always accelerates downward. However, gyroscopic yaw errors are not observable and hence are not correctable when a radar system is in straight, level, and constant velocity flight. Yaw error is also known as "heading" error, with heading error being an orientation error, as opposed to a translational error due to direction of platform flight.

Conventionally the complete alignment of a GPS-aided IMU navigator during flight requires substantial horizontal accelerations to make the heading error observable. Such accelerations are typically sustained for a number of seconds (for example, 10-20 secs) with a magnitude in the order of about 0.5 G in the horizontal direction. Aircraft typically perform maneuvers such as S-turns or circles to accomplish the required acceleration. For a 'tactical grade' IMU, such an S-turn might be required, for example, every 15 minutes or so, thereby potentially disrupting the mission of the aircraft as well as negatively affecting passenger comfort. Linear accelerations can also be utilized to accomplish IMU alignment, but their application on board an aircraft is limited.

Other techniques do exist to measure heading error and facilitate alignment of the radar navigator. Some techniques are better suited to correct for small errors, other techniques are better suited to correct for large errors, while some techniques can do both. One class of techniques involves the employment of additional instruments for detecting platform (e.g. aircraft) attitude, and ultimately attitude of a radar system located on the platform. An example of such an instrument is a digital flux-gate compass. However, such compass systems can be very sensitive to extraneous ferrous metal and difficult to mount in a manner to provide a desired accuracy.

Another example is a GPS-based Attitude Determination Unit (ADU) which employs multiple widely spaced GPS antennas with differential measurements to determine platform attitude. However, an ADU system requires additional hardware beyond that utilized in a typical radar GPS-aided IMU installation. This in turn represents additional cost and complexity, as well as size, weight, and power demands on the platform. A particular platform may, for example, not allow the mounting of the widely spaced additional antennas required for the ADU.

The employment of a higher grade IMU, for example a 'navigation grade' IMU instead of a 'tactical grade' IMU, may facilitate holding an acceptable alignment for many hours. However, this comes at a cost of increased price (often by a factor of 5 to 10), as well as additional size, weight, and power. In addition, an initial alignment is still required by conventional techniques, such as an S-turn. However, some aircraft are not capable of S-turns that can generate sufficient horizontal accelerations. Examples of these are many dirigibles and blimps.

Measurement and correction of a navigator heading error while in flight by analyzing SAR images is also available. While such an approach can work for small heading errors, it is not able to perform an initial alignment for a large initial error. Essentially, the technique performs well for keeping an IMU aligned once an initial alignment has been achieved. However, as with the navigation grade IMU, an initial alignment is still required by a conventional technique, such as an S-turn.

A well-known technique for providing an initial alignment to an IMU is termed a "ground alignment" whereby the aircraft is stationary on the ground for some period of time (perhaps 15 minutes) at a known location allowing the IMU to sense the rotation of the earth, and orient itself accordingly. However, this technique has limited accuracy and precision especially for tactical grade IMUs, and furthermore precludes performing an initial alignment while in flight, such as might be required with a system restart. Landing an aircraft for each system restart is generally not feasible.

While in flight, a navigator can be aligned to the body of the aircraft, but there is no guarantee that the body is pointed in the exact direction of flight. The angular difference between the front of the aircraft body and the direction of flight is termed the "crab" angle of the aircraft, and is generally unknown due to unknown winds aloft (both in terms of speed and direction). Crab angles can be particularly large for large slow-moving aircraft such as many dirigibles and blimps.

Consequently, it becomes desirable to perform an initial alignment of the GPS-aided IMU navigator while the radar is in flight, where the initial alignment doesn't employ any additional instrumentation beyond the normal GPS-aided IMU navigator and perhaps the radar system itself, and can be accomplished during straight, level, and constant velocity flight.

One technique that utilizes a radar system to determine direction of flight with respect to an aircraft body is embodied in a class of radar systems called Doppler navigation radars. Such radar systems utilize multiple beams directed in different bearing directions with respect to the aircraft. The beams are generally transmitted with fixed angular differences. The Doppler information of these beams is compared to determine the direction of translation of the radar over the ground with respect to the aircraft body. Doppler navigation radars are custom systems that represent additional equipment with additional cost and complexity, as well as size, weight, and power demands on the platform.

Another navigation technique using radar is known as Terrain Contour Matching (TERCOM). This technique uses a radar altimeter to generate a height profile of the ground below an aircraft, and then attempts to match it to a prerecorded contour map of the terrain. While this enhances the position and velocity information available to the navigator, it does not address angular yaw or heading errors.

More generally, fiducial targets, such as known landmarks, can be employed to determine heading errors, but this requires prior knowledge of those landmarks, or limits the region over which an alignment can occur. A variant of this is to match specific radar echoes to data reported by other means, such as Automatic Identification System (AIS) reports. This, however, again requires additional instrumentation, and of course the presence of suitably equipped craft.

SUMMARY

The following is a brief summary of subject matter that is described in greater detail herein. This summary is not intended to be limiting as to the scope of the claims.

Various exemplary embodiments presented herein relate to determining and correcting a heading error. In an exemplary embodiment, a radar system located on an aircraft can include a navigator component configured to determine at least one of a maximum Doppler frequency or a minimum Doppler bandwidth in a plurality of radar echoes. In a further embodiment, the navigator can be further configured to correct a heading error of the aircraft based on a direction relating to the at least one of the determined maximum Doppler frequency or the determined minimum Doppler bandwidth.

Another exemplary embodiment comprising a method for determination of a heading error along with correcting the heading error is presented. The method comprising determining for each squint angle in a plurality of squint angles, at least one of a maximum Doppler frequency and a minimum Doppler bandwidth for each squint angle, wherein the plurality of squint angles relating to a plurality of radar echoes being received at an antenna located on an aircraft. In an embodiment, the method further comprising determining, from the plurality of radar squint angles, a squint angle having the maximum Doppler frequency with the minimum Doppler bandwidth. In a further embodiment, the method further comprises setting an actual direction of an inertial measurement unit to the squint angle having the maximum Doppler frequency with the minimum Doppler bandwidth. And in a further embodiment, the method further comprises determining a heading error of the aircraft based on resolving the difference between an indicated direction for the inertial measurement unit and the set actual direction of an inertial measurement unit.

A further exemplary embodiment for determination of a heading error and correction of the heading error comprises a computer-readable medium comprising instructions that, when executed by a processor, cause the processor to perform acts comprising determining for each squint angle in a plurality of squint angles, at least one of a maximum Doppler frequency and a minimum Doppler bandwidth for each squint angle, wherein the plurality of squint angles relating to a plurality of radar echoes being received at an antenna located on an aircraft. In a further embodiment, the acts further comprising determining, from the plurality of radar squint angles, a squint angle having the maximum Doppler frequency with the minimum Doppler bandwidth. In another embodiment, the acts further comprising setting an actual direction of an inertial measurement unit to the squint angle having the maximum Doppler frequency with the minimum Doppler bandwidth. And in another embodiment, the acts further comprising determining a heading error of the aircraft based on resolving the difference between an indicated direction for the inertial measurement unit and the set actual direction of an inertial measurement unit.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
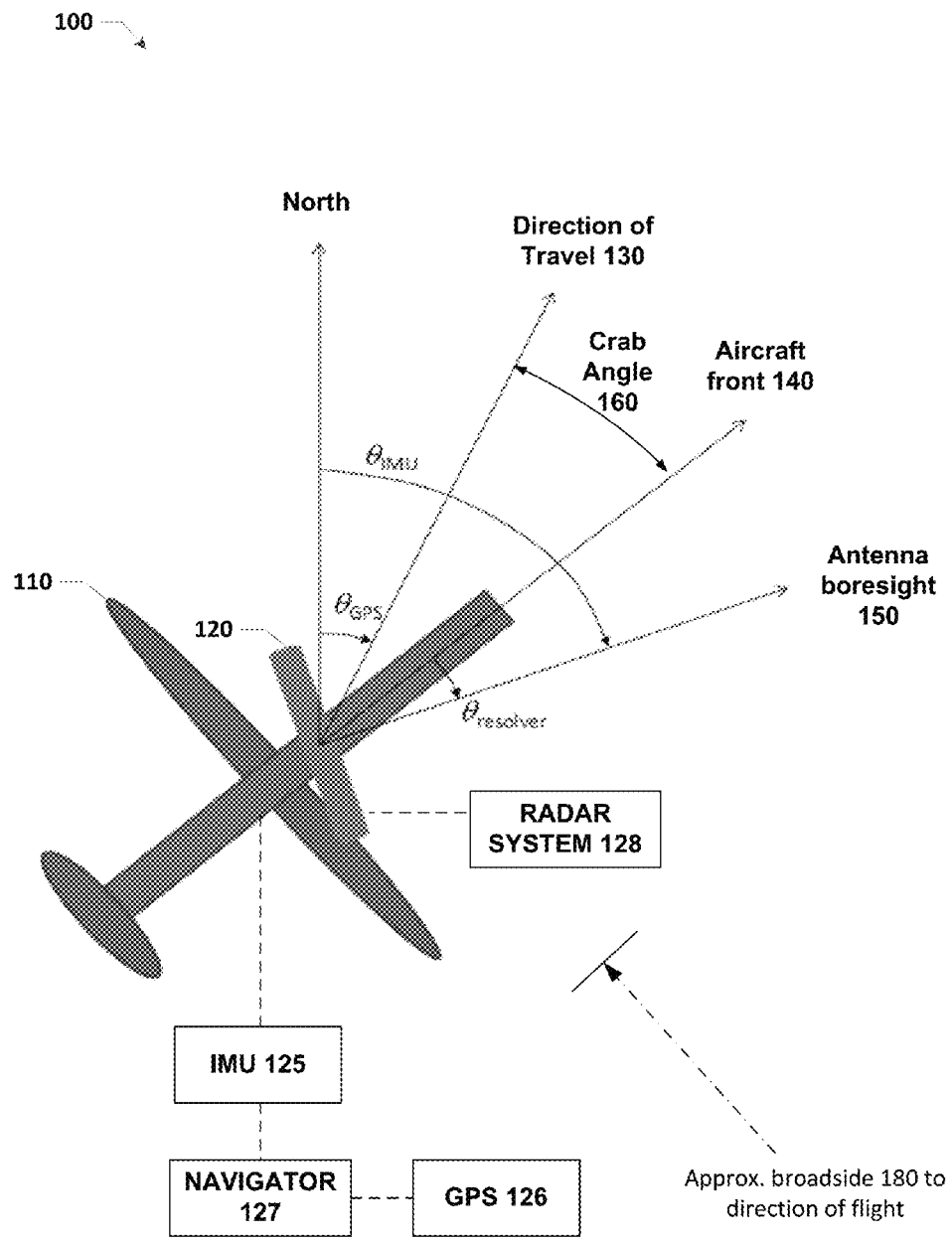
FIG. 1 illustrates a system comprising an aircraft and associated radar system undergoing yaw, according to an embodiment.

Various technologies pertaining to determining and correcting a heading error are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As noted above, exemplary embodiments presented herein relate to determination and correction of a heading error. As described in the Background, angular measurements received from an IMU gyroscope can drift, thereby manifesting a yaw or "heading" error. Such heading errors are not observable with common GPS-aided IMU navigation systems during straight, level, constant velocity flight. Especially problematic are the large heading errors observed after a system reset.

In one or more embodiments, as described further herein, a radar system is configured to determine the direction of flight, independent of crab angle, by observing the characteristics of a processed range-Doppler map. The Doppler characteristics of a plurality of radar echoes exhibit greatest Doppler frequency, and with minimum spread (Doppler bandwidth), for ground clutter when a radar antenna is pointed in the direction of flight. In a further embodiment, the antenna pointing direction having a maximum Doppler frequency along with a minimum Doppler bandwidth can be determined by scanning the radar antenna while collecting data, and processing intervals of the collected data into range-Doppler maps. Consequently, by determining the reported antenna pointing direction for the range-Doppler map exhibiting greatest clutter frequency and minimum Doppler bandwidth, and comparing the reported antenna pointing direction with GPS-derived direction of flight, a heading error can be calculated. The heading error can be fed back into a navigation system (e.g., a Kalman Filter) to facilitate alignment of the navigator. In an embodiment, GPS-derived data can describe a translational flight direction of the aircraft. In another embodiment, collecting the radar-based data to determine the direction of maximum Doppler frequency and/or minimum Doppler bandwidth for ground clutter can be performed by scanning a radar antenna over a large angular segment around an approximate flight direction of the aircraft. A suitable approximate flight direction of the aircraft may be the nominal front of the aircraft, whereby the angular segment should be large enough to encompass any expected crab angle. Alternatively, a radar system can sample Doppler in specific directions and calculate the desired direction from the samples. In a further embodiment, rather than searching for a maximum Doppler, the radar system may search for a minimum Doppler of ground clutter to find the direction opposite the flight direction. Such an approach would still yield a minimum Doppler bandwidth for ground clutter.

In accordance with one or more embodiments presented herein, a radar system can assist in aligning an IMU, even for large heading errors, without the need for problematic maneuvers and/or additional instrumentation. In the following it is assumed that all angles are positive when measured in a clockwise direction. Thus, rotating clockwise increases the angular measure.

Two applications are presented herein:
Situation 1: an IMU is located on a gimbal, and
Situation 2: an IMU is located on an aircraft body.

It is to be appreciated that while exemplary situations 1 and 2 represent the most common motion measurement system configurations, the various embodiments presented herein are equally applicable to other configurations to which the various aspects presented herein are pertinent. It is to be further appreciated that while the various embodiments are directed towards heading error of an aircraft, the embodiments can be equally applied to any system requiring correction of heading error, where such system can comprise a ship, vehicle, etc.

1. The IMU is Located on a Gimbal

FIG. 1 illustrates system 100 comprising an aircraft and associated radar system undergoing yaw, according to an embodiment. In system 100, an IMU 125 located on aircraft 110 is measuring the orientation of a gimbaled antenna 120 located on aircraft 110 with reference to a direction of travel 130 and the aircraft front 140. In an embodiment, the IMU 125 is utilizing a navigator 127 which can include an estimator (e.g., an LQE, a KF, an EKF, etc.) and/or a GPS 126. An on board radar system 128 is operating in conjunction with the antenna 120, the IMU 125, GPS 126, and navigator 127. The combining of the GPS 126 and IMU 125 data to estimate errors and corrections, and to achieve a blended motion measurement solution, is often performed utilizing an estimator such as an LQE, a KF, an EKF, etc., where the estimator and its implementation are frequently termed a navigator, e.g., navigator 127. Further, correction of IMU 125 motion information can be referred to as alignment of the navigator 127. The measurements available to the radar system 128, or an associated component (e.g., any of 125, 126, and/or 127) include:

$\theta_{GPS}$=the direction of travel 130 as measured by GPS 126 with respect to north, $\theta_{resolver}$=the orientation of the gimbaled antenna 120 with respect to the aircraft front 140 of aircraft 110, and $\theta_{IMU}$=the orientation of the antenna boresight 150 as measured by the IMU 125.

Crab angle 160 is the angle between the direction of travel 130 and the aircraft front 140.

Alignment of the navigator 127 equates to calibration such that $\theta_{IMU}$ is correct and accurate. With reference to system 100, two versions of $\theta_{IMU}$ can be defined as follows:

$\theta_{IMU,indicated}$=the indicated orientation of the IMU 125 as determined by the IMU 125 itself, and $\theta_{IMU,actual}$=the actual or true orientation of the IMU 125.

As mentioned, the value $\theta_{IMU,indicated}$ is a directional measurement derived by the IMU 125 itself. It is desired that the two versions of IMU values are equal, that is, that the value of $\theta_{IMU,indicated}$ is equal to the value of $\theta_{IMU,actual}$. The difference between the $\theta_{IMU,indicated}$ and the $\theta_{IMU,actual}$ is the heading error, that is:

$$\theta_{heading\_error} = \theta_{IMU,indicated} - \theta_{IMU,actual} \qquad \text{Eqn. 1}$$

In a situation where the $\theta_{heading\_error}$ value is sufficiently small (e.g., less than a defined amount, aka, a residual error), the navigator can be considered to be aligned. In a situation where the $\theta_{heading\_error}$ value is of a magnitude that is greater than the residual error, then the navigator 127 is considered to not be aligned, e.g., motion information associated with the IMU 125 needs to be corrected to facilitate alignment of the navigator 127. The degree of allowable residual error is application dependent. For many SAR/GMTI applications, a residual error less than about 0.5 degrees for an initial coarse alignment can be sufficient, assuming additional technologies/systems exist to provide a supplemental 'fine' alignment. A 'fine' alignment to an accuracy of about 0.05 degrees is often adequate for most SAR/GMTI operations. For some radar systems, notably those that use multiple antenna phase centers to perform Direction of Arrival (DOA) measurements, such as endoclutter GMTI, a higher degree of accuracy and precision than that utilized in fine alignment may be required.

Alignment of the navigator 127 requires an independent measurement, or calculation, of the true antenna boresight 150 direction, that is $\theta_{IMU,actual}$, or equivalent. The independent measurement can be obtained by scanning the antenna 120 in azimuth while operating the radar system 128 to determine the orientation of the antenna 120 that provides maximum Doppler frequency with minimum Doppler bandwidth for ground clutter in the radar data. Maximum Doppler frequency with minimum Doppler bandwidth occurs when the antenna boresight 150 is aligned with the direction of travel 130. Such an alignment can be performed without regard for the indicated IMU orientation, $\theta_{IMU,indicated}$. When this orientation has been found, the following is determined:

$$\theta_{IMU,actual} = \theta_{GPS} \qquad \text{Eqn. 2}$$

In accord with Eqn. 2, the $\theta_{heading\_error}$ of the navigator 127 becomes the difference between the indicated orientation of the IMU 125 and values generated by GPS 126:

$$\theta_{heading\_error} = \theta_{IMU,indicated} - \theta_{GPS} \qquad \text{Eqn. 3}$$

The calculated $\theta_{heading\_error}$ can then be fed back into the estimator of the navigator 127 to facilitate correction of the heading error, driving $\theta_{heading\_error}$ to zero, as desired.

2. The IMU is Located on an Aircraft Body

Figure 2:
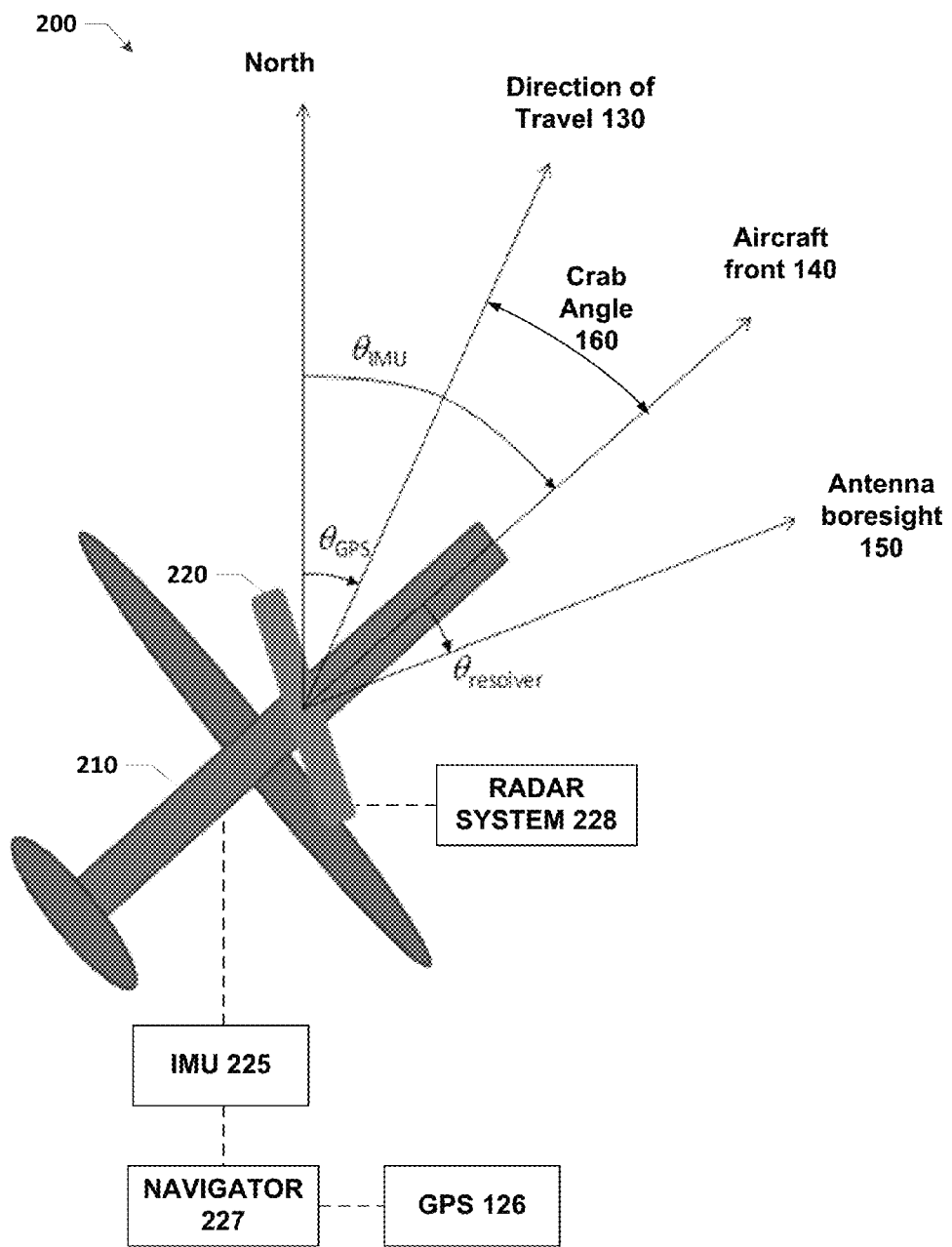
FIG. 2 illustrates a system comprising an aircraft and associated radar system undergoing yaw, according to an embodiment.

FIG. 2 illustrates system 200 comprising an aircraft and associated radar system undergoing yaw, according to an embodiment. In this system, an IMU 225 located on aircraft 210 is measuring the orientation of the aircraft body 210 with reference to the direction of travel 130, and the aircraft front 140, wherein the IMU 225 is utilizing a navigator 227 which can include an estimator (e.g., an LQE, a KF, an EKF, etc.) and/or a GPS 126. An on board radar system 228 is operating in conjunction with the antenna 220, the IMU 225, GPS 126, and navigator 227. Comparing FIG. 2 with FIG. 1, the $\theta_{IMU}$ of system 100 is being measured between north and the antenna boresight 150, while the $\theta_{IMU}$ of system 200 is being measured between north and the aircraft front direction 140. The measurements available to the radar system 228 include:

$\theta_{GPS}$=the direction of travel 130 as measured by GPS 126, $\theta_{resolver}$=the orientation of the gimbaled antenna 220 with respect to aircraft front 140, $\theta_{IMU}$=the orientation of the aircraft body 210 as measured by the IMU 225.

The crab angle 160 is again the difference between the direction of travel 130 and the aircraft front 140.

Alignment of the navigator 227 equates to a calibration such that $\theta_{IMU}$ is correct and accurate. With reference to system 100, two versions of $\theta_{IMU}$ are as follows:

$\theta_{IMU,indicated}$=the indicated orientation of the IMU 225 itself, and $\theta_{IMU,actual}$=the actual or true orientation of the IMU 225.

The value $\theta_{IMU,indicated}$ is a measurement determined by the IMU 225 itself. It is desired that the two versions of IMU values are equal, that is, that the value of $\theta_{IMU,indicated}$ is equal to the value of $\theta_{IMU,actual}$. The difference between the $\theta_{IMU,indicated}$ and the $\theta_{IMU,actual}$ is the heading error, that is:

$$\theta_{heading\_error} = \theta_{IMU,indicated} - \theta_{IMU,actual} \qquad \text{Eqn. 4}$$

When $\theta_{heading\_error}$ is sufficiently small, the navigator is aligned. When $\theta_{heading\_error}$ is too large, the navigator is not aligned. The degree of allowable residual error is application dependent. To minimize repetition, comments regarding required accuracy and precision as detailed in the previous section with regard to system 100 similarly apply to system 200.

Alignment of the navigator 227 requires an independent measurement, or calculation, of the true antenna boresight 150 direction, that is $\theta_{IMU,actual}$ or equivalent. As previously stated with regard to system 100, one technique for obtaining the independent measurement is to scan the antenna 220 in azimuth while operating the radar system 228, and determine an orientation of the antenna 220 that provides maximum Doppler frequency with minimum Doppler bandwidth for ground clutter in the data of radar system 228. Maximum Doppler frequency with minimum Doppler bandwidth occurs when the antenna boresight 150 is aligned with the direction of travel 130. Such an alignment can be performed without regard for the indicated IMU orientation. When this orientation has been found, the following can be determined:

$$\theta_{IMU,actual} + \theta_{resolver} = \theta_{GPS} \qquad \text{Eqn. 5}$$

The $\theta_{heading\_error}$ of navigator 227 becomes the difference between the indicated orientation of the IMU 125, and values provided by the GPS 126. That is:

$$\theta_{heading\_error} = \theta_{IMU,indicated} - \theta_{GPS} + \theta_{resolver} \qquad \text{Eqn. 6}$$

The calculated $\theta_{heading\_error}$ can then be fed back into the estimator of the navigator 127 to correct the heading error, driving $\theta_{heading\_error}$ to zero, as desired.

Finding Direction of Travel Using Radar

In the foregoing it is presumed that an independent measurement of direction of travel 130 can be determined by operating the radar system 128/228 and scanning the antenna 120/220 in azimuth to find the antenna orientation that provides maximum Doppler frequency with minimum Doppler bandwidth for ground clutter in the radar data. There are a number of ways to find the direction of maximum Doppler and minimum bandwidth, in association with pertinent considerations.

The relationship of Doppler frequency shift to geometric parameters can be expressed as follows:

$$f_d = -\frac{2}{\lambda}\frac{d}{dt}r_s \qquad \text{Eqn. 7}$$

where:
$\lambda$=wavelength of the nominal radar signal, and
$r_s$=the range between the radar and some radar signal reflector.

For an arbitrary radar velocity vector (speed and direction), the Doppler shift can be expressed as:

$$f_d = \frac{2}{\lambda}v_a\cos\phi_s \qquad \text{Eqn. 8}$$

where:
$v_a$=the forward speed of the aircraft, and
$\phi_s$=the angle between radar flight direction and signal reflector.

For a straight and level flying radar, and a stationary reflector, Eqn. 8 can be expanded to:

$$f_d = \frac{2}{\lambda}v_a\cos\theta_s\cos\psi_d \qquad \text{Eqn. 9}$$

where:
$\theta_s$=the horizontal squint angle between radar ground track and signal reflector, and
$\psi_d$=the depression angle between horizontal and signal reflector, For a radar not flying straight and level, the angles are with respect to the velocity vector of the radar.

Unless otherwise noted, it is hereafter assumed a flat earth, that is, all radar echoes reflecting from a planar surface below the radar. Furthermore, it is assumed that the ground consists of uniform clutter, essentially stationary.

Maximum Doppler Direction

Figure 3:
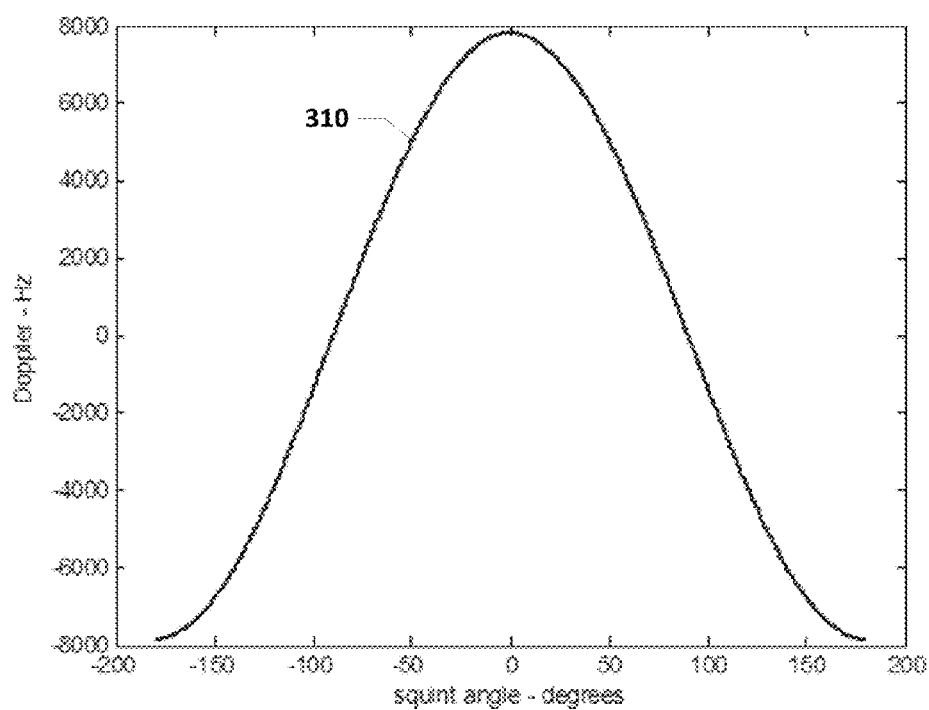
FIG. 3 is a plot illustrating an exemplary Doppler frequency shift as a function of squint angle with respect to a velocity vector.
Figure 4:
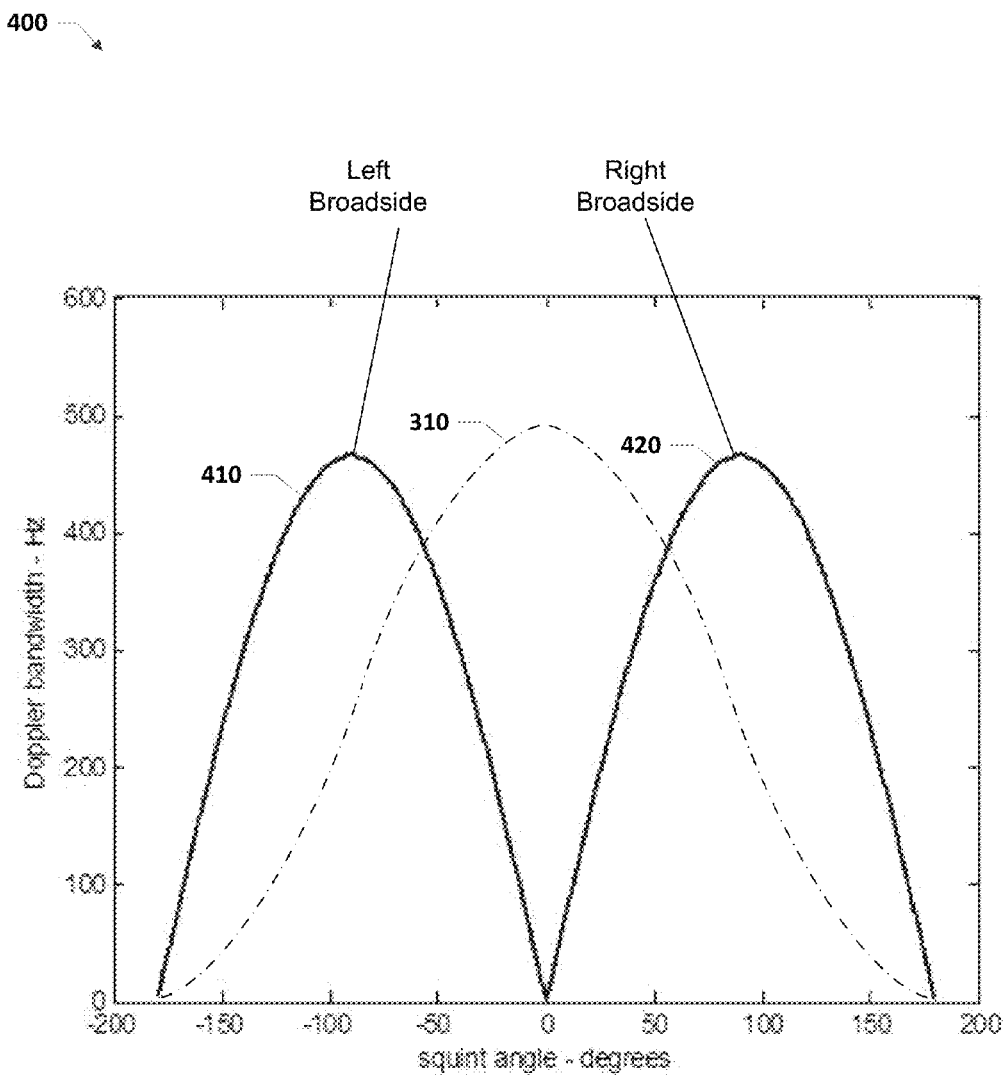
FIG. 4 is a plot illustrating an exemplary Doppler bandwidth as a function of squint angle with respect to a velocity vector.

As previously stated, Doppler frequency shift can be maximum and Doppler bandwidth can be minimum for a radar echo from stationary objects in the direction of flight (radar translation). Furthermore, for a radar system in straight and level flight above a flat earth, the Doppler frequency is maximum for ground clutter forward of the ground track of the radar. FIG. 3 illustrates Doppler frequency shift as a function of squint angle with respect to a velocity vector. FIG. 4 illustrates Doppler bandwidth as a function of squint angle with respect to a velocity vector. In an embodiment, plots 310, 410 and 420 can be obtained at any suitable frequency band, such as a Ku-band. In a further embodiment, the Doppler bandwidths illustrated in FIG. 4 can be measured with respect to about a −3 dB one-way antenna beamwidth. As illustrated in FIG. 4, the behavior of the Doppler bandwidths is presented with respect to a flat earth scenario. As further illustrated in FIG. 4, by overlaying plot 310 (broken line) with plots 410 and 420 it can be seen that the maximum Doppler frequency occurs between the bandwidth plots 410 and 420 with regard to squint angle. From FIG. 3, it is noted that in the direction of the ground track of the radar, the Doppler frequency peak 310 is a rather broad peak. However, From FIG. 4, the Doppler bandwidth plots 410 and 420 exhibit a rather sharp null. Based on the foregoing, in an embodiment, a measure of the Doppler bandwidth of the ground clutter may provide a more accurate indicator for radar flight direction.

In an embodiment, plot 310 is generated with a grazing angle of about 20°, a radar velocity of about 75 m/s, and a radar wavelength of about 0.018 m. In an embodiment, plots 410 and 420 are generated with a grazing angle of about 20°, a radar velocity of about 75 m/s, an antenna az beamwidth of about 3.2°, and a radar wavelength of about 0.018 m.

Figure 5:
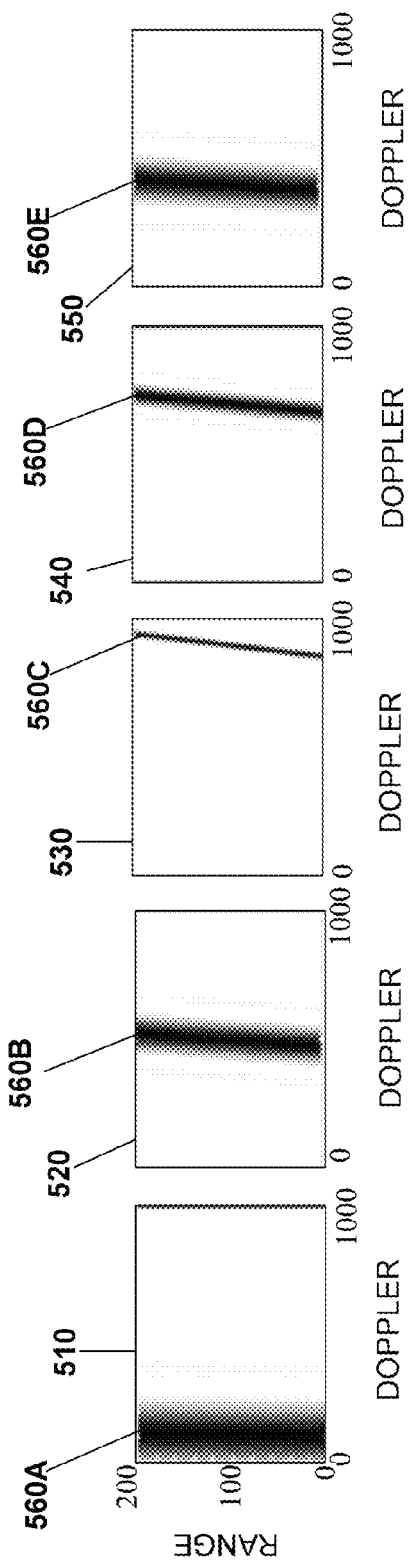
FIG. 5 illustrates a sequence of range-Doppler clutter echo maps corresponding to specific azimuth scan directions during a scan, according to an embodiment.

A sequence of range-Doppler clutter echo maps which correspond to specific azimuth scan directions during a radar scan is illustrated in FIG. 5. As illustrated in FIG. 5, as the clutter band moves to greater positive frequencies (e.g., scans 510-520-530), the band also becomes thinner (as indicated by the narrowing thickness of bands 560A-560B-560C), representing a narrower clutter bandwidth. As the scan passes the direction of flight (e.g., scans 530-540-550), the clutter band moves to lesser Doppler frequencies and becomes broader, as indicated by the increasing thickness of bands 560C-560D-560E. The change in slope of the band (e.g., slope of 560A vs. 560C) is due to far ranges having shallower depression angles than nearer ranges, therefore being closer to the direction of flight. The widest measured Doppler bandwidth (e.g., 560A) is nearest to a Doppler effect of zero, and thus, is effectively nearest to the broadside 180 of the flight path of aircraft 110 or 210. All the range-Doppler clutter echo maps exhibited in FIG. 5 are forward of zero Doppler, and hence are forward of broadside 180 to the flight path.

Minimum Doppler Direction

FIGS. 3 and 4 also illustrate that another indicator of flight direction over a flat earth is the direction of minimum Doppler frequency for ground clutter, albeit the direction of minimum Doppler is opposite the forward ground track of the radar. This direction of minimum Doppler shift also exhibits a rather broad peak, but like the direction of maximum Doppler, also exhibits a rather sharp null in Doppler bandwidth, making the null a more precise direction indicator.

Zero Doppler Direction

FIG. 3 further illustrates that Doppler frequency shift is zero at directions perpendicular (broadside 180) to the radar flight path. Consequently, finding the direction of zero Doppler shift can yield the direction perpendicular to the flight path. For straight and level flight, a 90 degree adjustment in the determined direction of zero Doppler shift can yield the forward direction of the radar ground track.

It is to be appreciated that in an embodiment, for observations performed with respect to the left side of the flight path will require addition to the bearing, and observations to the right side will require subtraction from the bearing. For ascending or descending aircraft, the forward direction can be considered to be the direction between left-side and right-side directions of zero Doppler shift.

It is to be noted from FIG. 4 that the Doppler bandwidth of the ground clutter return is maximum at these broadside directions. Based thereon, determining the zero-Doppler direction(s) might not be as accurately performed as determination of the maximum or minimum Doppler directions discussed earlier.

Split Equal Doppler Measures

From FIG. 3, it is to be noted that the plot of Doppler shift for a flat earth ground clutter is symmetric about the flight direction of the radar. Thus any two directions that yield identical Doppler shifts can be bisected to determine the ground-track of the radar system 128 or 228.

Further, it is noted from FIG. 4, however, that Doppler bandwidth increases as the antenna pointing direction moves towards broadside of respective plots 410 and 420. Consideration can be made of the inherent imprecision of such broadside measurements as the antenna points away from the forward, or rearward, direction of flight.

Multiple Unequal Doppler Measures

As illustrated in FIG. 3, the shape of curve 310 is deterministic, that is, for a flight path with the given geometry and all but heading error known, the shape of curve 310 can be calculated in its entirety. As an unknown heading error manifests itself the only unknown is the direction (angle) of the peak. A different radar flight geometry (e.g. different grazing angle, ascending/descending flight path, etc.) could yield an equivalent calculable curve. However, with as little as two Doppler values, each measured in different directions, the measured Doppler values can be fitted to the curve 310 with a subsequent direction of maximum response estimated, and hence the ground track can be determined. As more measures in other relative pointing directions are obtained, an estimation of the radar ground track can be further improved. For example, three or more Doppler frequency measures in different but known relative directions can facilitate determination of an entire 3-D velocity vector in IMU (e.g., 125 or 225) indicated coordinates. Hence, based on the foregoing, the fundamentals of Doppler Navigation can be achieved. The fundamentals of Doppler Navigation can be achieved even though most practical systems use four simultaneous beams in a "Janus" configuration, that is, with a convenient symmetry both fore/aft, and left/right.

Operational Considerations

Operational issues to be expected and considered are presented below.

A) Scanning Angles

When looking for the maximum Doppler frequency associated with the direction of flight, it is necessary to scan the antenna (e.g., antenna 120 or 220) across the actual direction of flight. Accordingly, the antenna scan start position and scan end position should be selected with a combined angle to account for the maximum expected unknown crab angle 160 of the aircraft 110 or 210. That is, the scan 'start' angle with respect to the aircraft front 140 should be selected to one side of the aircraft front 140 by an amount greater than the maximum expected crab angle 160, and the scan 'end' angle with respect to the aircraft front should be selected to the other side of the aircraft front by an amount greater than the maximum expected crab angle 160. Such an approach will ensure that the aircraft direction of travel 130 is within the scan. Similar considerations should be given when looking for any other specific angle with respect to the direction of travel 130, such as the direction of minimum Doppler, zero Doppler, etc.

B) Ambiguous Doppler

Any pulsed-Doppler radar system can give rise to ambiguous Doppler measurements. Doppler ambiguity can be avoided by employing a radar pulse repetition frequency (PRF) that is at least twice the highest expected Doppler frequency shift. The PRF constraint could be relaxed if the radar system (e.g., 128 or 228) operates in a manner to guarantee unambiguous Doppler information in the measured data, for example, by scanning over a limited interval of angles with a bounded expected heading error. For example, if the unknown crab angle is nevertheless known to be less than 30 degrees, and a selected scan is from −60 to +60 degrees, then the exhibited Doppler would be known to be non-negative, and the PRF requirement can be relaxed such that it is greater than the highest expected Doppler frequency shift. When ambiguity exists, the Doppler frequency will be ambiguous by amounts that are integer multiples of the radar PRF.

In a situation where aliasing is expected, lower radar PRFs can be used with consideration to account for the aliasing of Doppler frequencies. Such an operation can be referred to as 'unwrapping' the Doppler. The approach comprises selecting the 'right' Doppler frequency from all the possible aliased Doppler frequencies. Unwrapping Doppler can be done in a variety of ways, usually with taking into account additional measurements. One or more of the following might be employed.

If the Doppler bandwidth is unambiguous, then it can be utilized to unwrap the Doppler. It is to be noted that the highest Doppler frequency coincides with the smallest Doppler bandwidth.

A 'true' velocity of the radar system (e.g., 128, 228) can be identified from GPS measurements generated by the onboard GPS system (e.g., 126, 226). A common assumption to begin an in-air alignment operation is to assume that the aircraft 110/210 is oriented with the front of the aircraft 140 in the same direction as the direction of travel 130. With such an approach, the heading error is equal to the crab angle 160. If the expected crab angle 160 can be bounded, the heading error can also be bounded. By bounding the crab angle 160 and the heading angle, the error in expected Doppler frequency shift can be bounded in any particular indicated pointing direction. In a situation where the Doppler error is bounded to less than half the PRF, then the Doppler can be considered to be unwrapped.

C) GPS Correspondence

It may be important that a velocity measurement from the radar system (e.g., 128, 228), at some indicated orientation of an IMU (e.g., 125, 225), can be matched in time with a velocity measurement received from the GPS (e.g., 126, 226), and further, in some situations with the resolver angles. The foregoing indicates a requirement for time-tagging the readings from the IMU (e.g., 125, 225) and resolver readings (e.g., associated with any of the navigator 127/227, GPS 126/226, etc.). Accordingly, the heading error is thereby limited to alignment errors and is not impacted by the motion of the radar system 128/228 itself.

D) Data Latency

As previously presented, it is anticipated that a heading error can slowly drift over time. Consequently, with properly time-tagged data associated with any of an IMU (e.g., 125, 225), a navigator (e.g., 127/227), and a GPS (e.g., 126/226), any calculations performed with the time-tagged data can tolerate substantial latency in application of a calculated result to the KF to facilitate alignment of the navigator. For example, a tolerance of tens of seconds is applicable for a tactical grade IMU based navigator.

E) Topography

In the preceding, the various embodiments have been detailed with an assumption of a flat earth scenario, that is, there is no significant topography to the clutter that the radar system is interrogating. Violating this presumption of flat earth can complicate the relationship of Doppler to ground track, and lead to errors.

Figure 6:
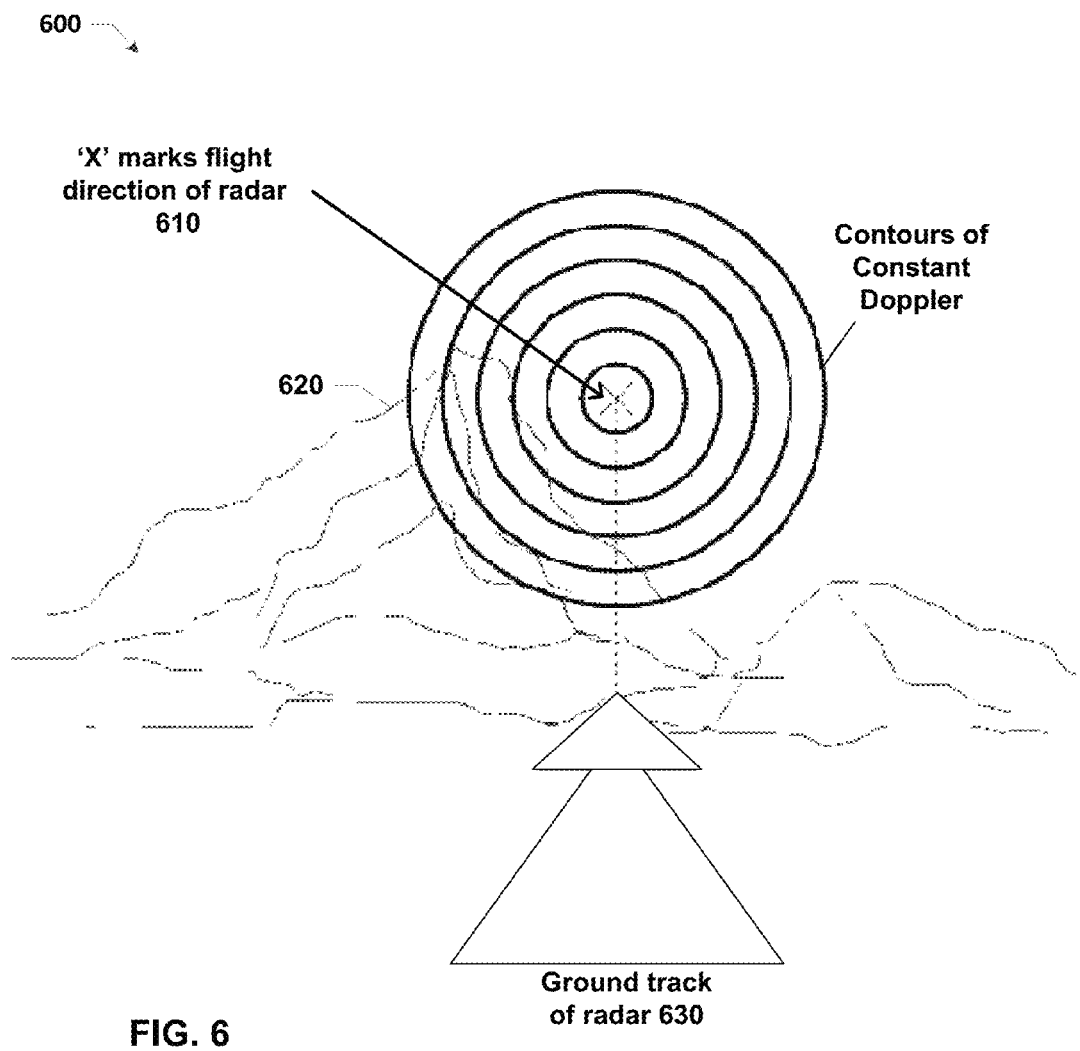
FIG. 6 illustrates a flight path conducted over a topography having a pronounced departure from a flat earth topography, according to an embodiment.

For example, FIG. 6, illustrates a notional flight path 610 conducted over a topography having a pronounced departure from a flat earth topography. In the exemplary flight path 610, the direction of maximum Doppler would not correspond to the ground track 630 of the radar. A segment of the mountain 620 to the left of the ground track 630 is closer to the 3-D flight direction of the radar system, thereby offering a higher Doppler shift at least at some ranges.

Figure 7:
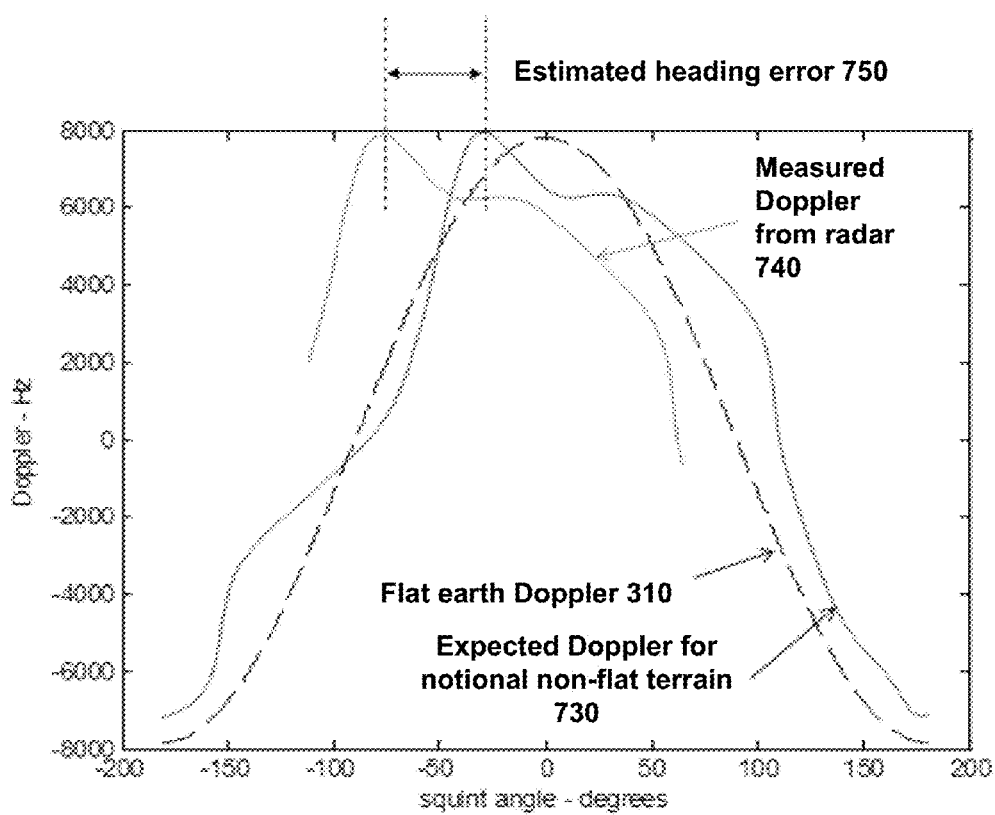
FIG. 7 illustrates a plot indicating the topographic effects on Doppler measurement according to an embodiment.

Knowledge of radar position and topography of the clutter landscape would allow development of a plot 310 of expected Doppler characteristics, while taking into account the topographic effects on Doppler. FIG. 7 illustrates a plot (plot 730) illustrating the topographic effects on Doppler measurement according to an embodiment. The departure from the flat earth Doppler 310, as illustrated in 730 is readily apparent. Further, the topographic effects can lead to a change in the estimated heading (as indicated by the estimated heading error 750) as a function of the measured Doppler received from radar system (e.g., 128/228) as indicated by plot 740. It is to be appreciated that prior knowledge of an area topography can be utilized to facilitate estimation of heading error 750. Prior knowledge of the topography of an area encompassing the radar's operational area can be stored in a Digital Elevation Map (DEM) associated with any of IMU 125/225, navigator 127/227, radar system 128, 228, or GPS 126.

F) Non-Ideal Clutter

In the foregoing, it has been assumed that a representative Doppler frequency and/or bandwidth of a clutter band in a range-Doppler map can be readily calculable as sufficient for comparison to other Doppler frequencies/bandwidths to determine a maximum or minimum, as required. While this is a straightforward concept for a uniform clutter reflectivity in a scene being interrogated by a radar system, in practice it may not be possible to expect such uniformity of clutter reflectivity. Variations in clutter reflectivity can be manifested as uncertainty in the measures of Doppler frequency and/or bandwidth. However, such uncertainty in clutter reflectivity can be reduced by any of a number of well-known techniques, including linear averaging, weighted averaging, nonlinear averaging, parametric curve fitting, etc., over range bands and/or multiple processing intervals, and possibly scans. Further, it has been assumed that the measured Doppler is due to radar motion alone, and the ground clutter is stationary. While such an assumption is generally true for land, it can generally not be true for water, with the potential for error over water bodies.

Figure 8:
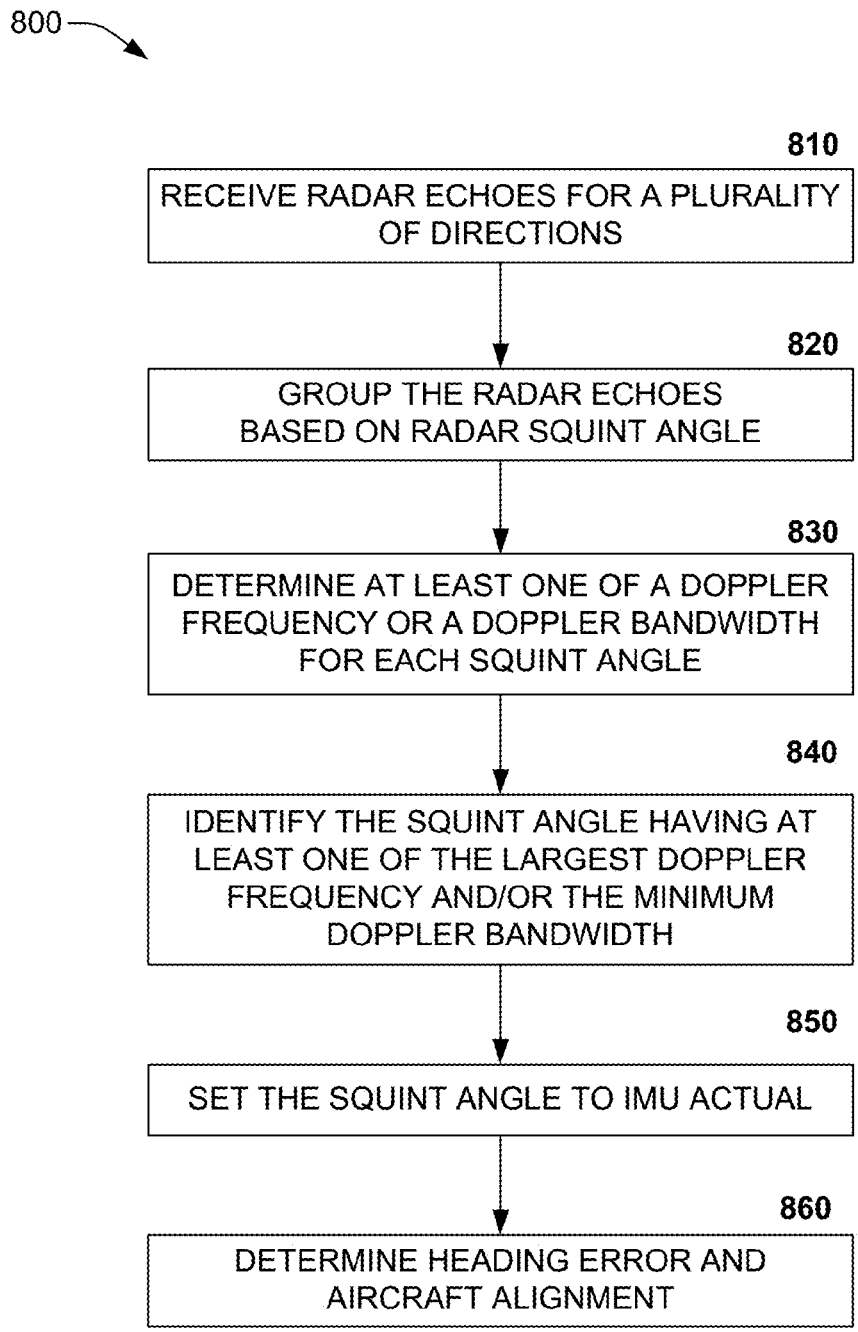
FIG. 8 is a flow diagram illustrating an exemplary methodology for determining heading error of an aircraft.

FIG. 8 illustrates an exemplary methodology relating to determination of heading error of an aircraft. While the methodology is shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 8 illustrates an exemplary methodology 800 for determining heading error of an aircraft. As previously mentioned, an IMU utilized for the determination of direction of an aircraft and/or the direction of an antenna boresight is prone to drift, thereby leading to manifestation of a yaw or "heading" error. Hence, while an IMU is determining the respective direction of the aircraft and/or antenna to be pointing in a particular direction ($\theta_{IMU,indicated}$), owing to the operational drift the IMU is actually pointing in a different direction ($\theta_{IMU,actual}$) with the difference between the indicated direction $\theta_{IMU,indicated}$ and the actual direction $\theta_{IMU,actual}$ being the $\theta_{heading\_error}$. A crab angle of the aircraft is the difference between the direction of the front of the aircraft body and the direction of flight. At 810, radar echoes are received at an antenna where the radar echoes are received across a plurality of angles with respect to any of the antenna boresight or aircraft front. As previously described, the angle over which the radar echoes are collected is ideally greater than the crab angle to ensure that the degree of directional difference between the aircraft front and the direction of travel is captured within the swept angle over which the radar signals are transmitted and the radar echoes are received.

At 820, the radar echoes can be divided into groups based on radar squint angle. For example, with respect to FIGS. 3 and 4, squint angle ranges of any magnitude can be utilized, e.g., squint angle bins of 1°, squint angle bins of 0.5°, squint angle bins of 5°, etc., can be chosen.

At 830, for each squint angle or squint angle bin a Doppler frequency and Doppler bandwidth can be determined. E.g., for a squint angle range of 0.5°, the Doppler frequency and Doppler bandwidth for data in bin 0-0.5°, for bin 0.5-1, for bin 1-1.5, for bin 1.5-2, etc., be determined.

At 840, as previously described, the squint angle having a maximum Doppler frequency with minimum Doppler bandwidth for ground clutter in the radar data can be considered an indicator of a direction of travel. Accordingly, by identifying the squint angle that has at least one of the maximum Doppler frequency and/or the minimum Doppler bandwidth the direction of travel can be identified.

At 850, the squint angle identified as having the maximum Doppler frequency with minimum Doppler bandwidth can be set to the $\theta_{IMU,actual}$.

At 860, the heading error is determined. In a situation where the IMU is located on a gimbaled antenna the heading error can be determined based at least on Equations 1-3 and 7-9. In a situation where the IMU is located on an aircraft body the heading error can be determined based at least on Equations 4-9. In an embodiment, $\theta_{IMU,actual}$ can be supplemented with data provided by a GPS, and the heading error can be determined based upon the supplemental data provided by the GPS.

Figure 9:
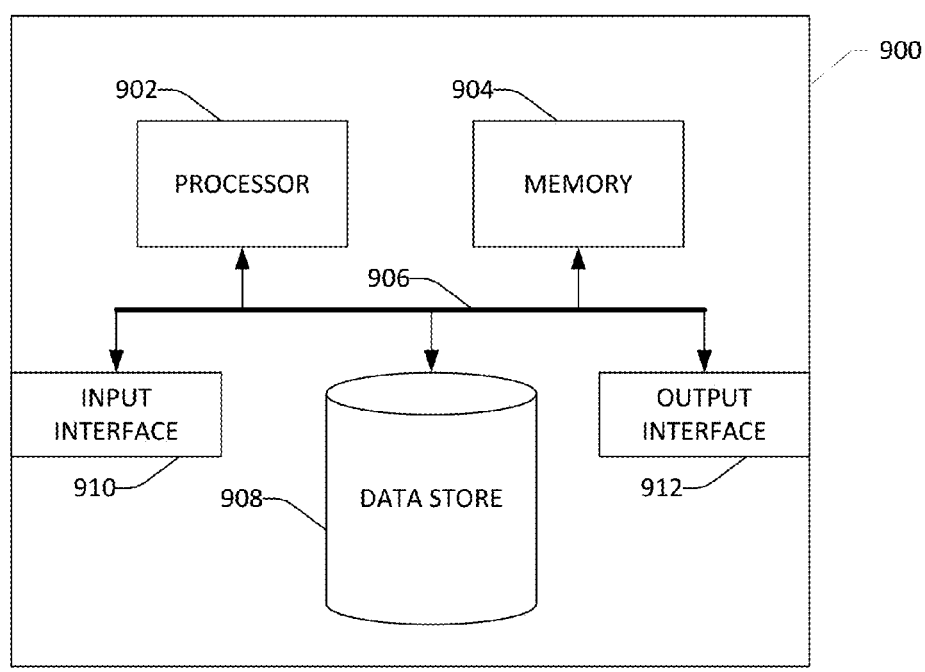
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be used in a system to determine and correct a heading error of a vehicle, such as an aircraft. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store operating parameters, required operating parameters, and so forth.

The computing device 900 additionally includes a data store 908 that is accessible by the processor 902 by way of the system bus 906. The data store 908 may include executable instructions, operating parameters, required operating parameters, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc., by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A radar system located on an aircraft comprising:
a navigator component configured to:
   determine Doppler frequencies and Doppler bandwidths in a plurality of radar echoes, the plurality of radar echoes collected during a scan of an antenna of the radar system;
   identify at least one of a Doppler frequency or a Doppler bandwidth in the Doppler frequencies and the Doppler bandwidths;
   identify an orientation of the antenna that corresponds to the at least one of the Doppler frequency or the Doppler bandwidth; and
   correct a heading error of the aircraft based on the orientation of the antenna.

2. The radar system of claim 1, wherein:
when the Doppler frequency is identified, the Doppler frequency is a maximum Doppler frequency from amongst the Doppler frequencies; and
when the Doppler bandwidth is identified, the Doppler bandwidth is a minimum Doppler bandwidth from amongst the Doppler bandwidths.

3. The radar system of claim 1, further comprising a global positioning system (GPS) configured to generate GPS data to supplement correction of the heading error, wherein the GPS data is generated based on the orientation of the antenna.

4. The radar system of claim 3, wherein the navigator component is further configured to determine a squint angle relating to the orientation of the antenna, and wherein the heading error of the aircraft is corrected based on the squint angle.

5. The radar system of claim 1, wherein the heading error relates to an indicated direction determined by an inertial measurement unit (IMU).

6. The radar system of claim 5, wherein the IMU is located on a gimbal of an antenna configured to receive the radar echoes.

7. The radar system of claim 5, wherein the IMU is located on the body of the aircraft.

8. The radar system of claim 1, wherein correction of the heading error comprises correction of an indicated direction determined by an inertial measurement unit (IMU) with the orientation of the antenna.

9. The radar system of claim 1, wherein the heading error results from drift in an inertial measurement unit (IMU) configured to provide directional data relating to the front of the aircraft relative to the direction of travel of the aircraft.

10. A method, comprising:
determining for each squint angle in a plurality of squint angles, at least one of a Doppler frequency or a Doppler bandwidth for each squint angle, wherein the plurality of squint angles relating to a plurality of radar echoes being received at an antenna located on an aircraft;
determining, from the plurality of radar squint angles, a squint angle having the maximum Doppler frequency with the minimum Doppler bandwidth;
setting an actual direction of an inertial measurement unit to the squint angle having the maximum Doppler frequency with the minimum Doppler bandwidth; and
determining a heading error of the aircraft based on resolving the difference between an indicated direction for the inertial measurement unit and the set actual direction of an inertial measurement unit.

11. The method of claim 10, wherein the inertial measurement unit is located on a gimbal of the antenna.

12. The method of claim 10, further comprising determining a global positioning system (GPS) direction of travel for the aircraft, wherein the GPS direction of travel is based on the set actual direction of an inertial measurement unit.

13. The method of claim 12, further comprising determining the heading error where the heading error is a function of the indicated direction for the inertial measurement unit and the GPS direction of travel.

14. The method of claim 12, further comprising determining a resolver angle based on the angle between the front of the aircraft and a boresight of the antenna.

15. The method of claim 14, further comprising determining the heading error where the heading error is a function of the indicated direction for the inertial measurement unit, the GPS direction of travel and the resolver angle.

16. The method of claim 10, wherein the inertial measurement unit is located on a body of the aircraft.

17. The method of claim 10, wherein the maximum Doppler frequency and a minimum Doppler bandwidth occurring for the squint angle aligned in the direction of travel of the aircraft.

18. A computer-readable storage medium comprising instructions that, when executed by a processor, cause the processor to perform acts comprising:
determining for each squint angle in a plurality of squint angles, at least one of a maximum Doppler frequency and a minimum Doppler bandwidth for each squint angle, wherein the plurality of squint angles relating to a plurality of radar echoes being received at an antenna located on an aircraft;
determining, from the plurality of radar squint angles, a squint angle having the maximum Doppler frequency with the minimum Doppler bandwidth;
setting an actual direction of an inertial measurement unit to the squint angle having the maximum Doppler frequency with the minimum Doppler bandwidth; and
determining a heading error of the aircraft based on resolving the difference between an indicated direction for the inertial measurement unit and the set actual direction of an inertial measurement unit.

* * * * *